United States Patent [19]
Hammel et al.

[11] Patent Number: 5,912,279
[45] Date of Patent: *Jun. 15, 1999

[54] POLYMER FOAMS CONTAINING BLOCKING AGENTS

[75] Inventors: Howard Sims Hammel, Bear; Robert Oliver York, Wilmington, both of Del.

[73] Assignee: E. I. du Pont de Nemours and Company, Wilmington, Del.

[21] Appl. No.: 08/898,979

[22] Filed: Jul. 23, 1997

Related U.S. Application Data

[63] Continuation-in-part of application No. 08/627,520, Apr. 4, 1996, which is a continuation of application No. 08/427,643, Apr. 24, 1995, Pat. No. 5,516,811, which is a continuation of application No. 07/973,599, Nov. 9, 1992, Pat. No. 5,439,947, which is a continuation of application No. 07/702,282, Jun. 28, 1991, abandoned, which is a continuation of application No. 07/577,045, Aug. 28, 1990, abandoned, which is a continuation of application No. 07/500,051, Mar. 23, 1990, abandoned

[60] Provisional application No. 60/022,575, Jul. 24, 1996.

[51] Int. Cl.$^6$ .................................................... C08G 18/14
[52] U.S. Cl. ........................... 521/146; 521/98; 521/131; 521/142; 521/155; 521/79
[58] Field of Search ............................. 521/131, 98, 155, 521/142, 146, 79

[56] References Cited

U.S. PATENT DOCUMENTS

| | | |
|---|---|---|
| 4,972,003 | 11/1990 | Grunbauer et al. . |
| 4,996,242 | 2/1991 | Lin . |
| 4,997,706 | 3/1991 | Smits et al. . |
| 5,001,164 | 3/1991 | Smits et al. . |
| 5,114,986 | 5/1992 | Lin . |
| 5,134,171 | 7/1992 | Hammel et al. . |
| 5,169,873 | 12/1992 | Behme et al. . |
| 5,182,040 | 1/1993 | Bartlett et al. . |
| 5,185,094 | 2/1993 | Shiflett . |
| 5,290,466 | 3/1994 | Shiflett . |
| 5,426,127 | 6/1995 | Doerge . |
| 5,430,071 | 7/1995 | Green et al. . |
| 5,447,964 | 9/1995 | Green et al. . |
| 5,451,614 | 9/1995 | Green et al. . |
| 5,455,283 | 10/1995 | Green et al. . |
| 5,461,084 | 10/1995 | Doerge . |
| 5,470,891 | 11/1995 | Green et al. . |
| 5,514,724 | 5/1996 | Green et al. . |
| 5,516,811 | 5/1996 | Bartlett et al. . |
| 5,532,284 | 7/1996 | Bartlett et al. . |
| 5,561,171 | 10/1996 | Demmin et al. . |

FOREIGN PATENT DOCUMENTS

| | | |
|---|---|---|
| 0 096 222 | 12/1983 | European Pat. Off. . |
| 345580 | 12/1989 | European Pat. Off. . |

*Primary Examiner*—John M. Cooney, Jr.
*Attorney, Agent, or Firm*—J. E. Shipley

[57] ABSTRACT

An improved closed cell polymer foam and foaming agent involving the use of a hydrogen-containing halocarbon blowing agent (e.g., HCFC-22) in combination with an effective amount of a hydrogen bond forming blocking agent (e.g., organic ether, ester or ketone). The presence of the blocking agent is shown to significantly reduce the escape of blowing agent from and entry of air into the foam resulting in low thermal conductivity over a longer period of time and improved thermal insulation value. A closed cell thermoplastic foam such as polyethylene, polypropylene, polystyrene, among others, is disclosed produced by means of an environmentally friendly nonflammable blowing agent substantially free of halogen substituents other than fluorine and comprising HFC-134 (1,1,2,2-tetrafluoroethane).

4 Claims, 6 Drawing Sheets

POLYMER FOAMS CONTAINING BLOCKING AGENTS

CROSS REFERENCE TO RELATED APPLICATIONS

This application claims the priority benefit of U.S. Provisional Application Ser. No. 60/022,575, filed Jul. 24, 1996. Also, this application is a continuation-in-part of in-prosecution U.S. application Ser. No. 08/627,520, filed Apr. 4, 1996, which is a continuation of U.S. application Ser. No. 08/427,643, filed Apr. 24, 1995, now U.S. Pat. No. 5,516,811, which is a continuation of U.S. application Ser. No. 07/973,599, filed Nov. 9, 1992, now U.S. Pat. No. 5,439,947, which is a continuation of abandoned U.S. application Ser. No. 07/702,282, filed Jun. 28, 1991, which is a continuation of abandoned U.S. application Ser. No. 07/577,045, filed Aug. 28, 1990, which is a continuation of abandoned U.S. application Ser. No. 07/500,051, filed Mar. 23, 1990.

The subject matter of the present application is also related to copending U.S. application Ser. No. 08/898,980, filed on even date herewith in the names of Creazzo and Hammel (attorney docket number CH-1600F)

The disclosure of the patents and patent applications are hereby incorporated by reference.

FIELD OF THE INVENTION

This invention relates to improved polymer foams and foaming agents by the use of blocking agents. More specifically, the invention relates to combinations of a hydrogen bond forming blocking agent and a hydrogen-containing halocarbon and a method of using the same in closed cell polymer foams to reduce permeation of air and/or hydrohalocarbon, thereby maintaining low thermal conductivity and improved thermal insulation value of the foam. The present invention further relates to using HFC-134 (1,1,2,2-Tetrafluoroethane) for producing thermoplastic foams.

BACKGROUND OF THE INVENTION

It is generally known and an accepted commercial practice to add a blowing agent to various polymeric materials during fabrication such as to produce a cellular (expanded foam) material. Typically, the blowing agent can be either a reactive solid or liquid that evolves a gas, a liquid that vaporizes, or a compressed gas that expands during final fabrication producing the desired polymeric foam. Such foams are categorically either closed cell (i.e., non-porous, continuous polymer phase with discontinuous gas phase dispersed therein) or open cell (porous) foams which are advantageously employed in various end use applications and exhibit various advantages associated with the particular type of foam produced. In describing the closed cell foam as involving a discontinuous gas phase, it should be appreciated that this description is an over simplification. In reality the gas phase is dissolved in the polymer phase and there will be a finite substantial presence of gas (blowing agent) in the polymer. Furthermore and as generally known in the art, the cell gas composition of the foam at the moment of manufacture does not necessarily correspond to the equilibrium gas composition after aging or sustained use. Thus, the gas in a closed cell foam frequently exhibits compositional changes as the foam ages leading to such known phenomenon as increase in thermal conductivity or loss of insulation value.

Closed cell foams are usually employed for their reduced thermal conductivity or improved thermal insulation properties. Historically, insulating polyurethane and polyisocyanurate foams have been made using trichlorofluoromethane, $CCl_3F$ (CFC-11), as the blowing agent. Similarly, insulating phenolic foam is known to be made from phenol-formaldehyde resins (typically via an intermediate resole mixture involving a phenol-formaldehyde oligomer condensate) using blends of 1,1,2-trichlorotrifluoroethane, $CCl_2FCClF_2$ (CFC-113), and CFC-11 as the blowing agent. Also, insulating thermoplastic foam such as polystyrene foam is commonly manufactured using dichlorodifluoromethane, $CCl_2F_2$ (CFC-12), as the blowing agent.

The use of a chlorofluorocarbon as the preferred commercial expansion or blowing agent in insulating foam applications is in part based on the resulting k-factor (i.e., the rate of transfer of heat energy by conduction through one square foot of one inch thick homogenous material in one hour where there is a difference of one degree Fahrenheit perpendicularly across the two surfaces of the material) associated with the foam produced. Thus, it is generally known and accepted that a chlorofluorocarbon gaseous phase within the closed cell is a superior thermal barrier relative to other inexpensive gases such as air or carbon dioxide. Conversely, the natural intrusion of air into the foam over time and to a lesser extent the escape of the chlorofluorocarbon from the cell is deleterious to the desired low thermal conductivity and high insulative value of the foams. Also, the escape of certain chlorofluorocarbons to the atmosphere is now recognized as potentially contributing to the depletion of the stratospheric ozone layer and contributing to the global warming phenomenon. In view of the environmental concerns with respect to the presently used chlorofluorocarbon blowing agents, it is now generally accepted that it would be more desirable to use hydrochlorofluorocarbons or hydrofluorocarbons rather than the chlorofluorocarbons. Consequently, the need for a method or way of inhibiting the permeation of air and blowing agent through the polymer phase of the polymeric foam exists and hopefully any such solution to the problem would be effective in inhibiting the permeation of the proposed alternative halocarbons.

Historically, various methods and compositions have been proposed, with varying degree of success, to alleviate and/or control problems associated with permeation of gases into and out of polymeric foams. For example, in U.S. Pat. No. 4,663,361 the problem of shrinkage (lack of dimensional stability) associated with using any blowing agent other than 1,2-dichlorotetrafluoroethane in the manufacture of foamed polyethylene is addressed. In this reference, a stability control agent is used in either a homopolymer or copolymer of ethylene wherein the blowing agent is isobutane or isobutane mixed with another hydrocarbon or a chlorocarbon, fluorocarbon or chlorofluorocarbon. The stability control agent is either partial esters of long chain fatty acids with polyols, higher alkyl amines, fatty acid amides, olefinically unsaturated carboxylic acid copolymers, or polystyrene. This reference also describes other prior art and is included by reference for such purpose.

In U.S. Pat. No. 4,243,717 a Fischer-Tropsch wax is added to expanded polystyrene beads to produce a stable cell structure in the foam, without specific reference to the permeation of blowing agent or air. In Canadian Patent 990,900 the use of a barrier material or blocking agent is disclosed to alleviate the problem of gas migration through the cell wall specifically at the time of foaming. The particular problem addressed in this Canadian patent is the rupture and total collapse of the cell walls that frequently occur in the manufacture of closed cell polyethylene foam. This problem is attributed to the fact that the cell walls for such foams are permeable to the rapidly expanding gas under the influence of the heat liberated by the exothermic polymer crystallization. The specific solution disclosed in this reference is to use a blend of polyethylene and polypropylene along with a barrier resin such as a elastomer containing polystyrene or acrylic resin which are intended to contribute high melt strength to the cell wall at the foaming temperature. An inert nucleant is also employed along with at least two gaseous propellants of substantially different vapor pressures.

In U.S. Pat. No. 4,795,763 the use of at least 2 percent carbon black as a filler uniformly dispersed in a polymeric foam is shown to reduce the aged k-factor of the foam to below the aged k-factor of the corresponding unfilled foam.

In general, thermoplastic foams are manufactured by mixing a volatile blowing agent with a molten thermoplastic resin under controlled conditions of temperature and pressure sufficient to form a plasticized, resin-blowing agent mixture and maintain the mixture in an unfoamed state. Thereafter, the mixture is extruded through a suitable die into a zone of lower pressure at a controlled temperature to obtain a substantially closed cell structure having a desired shape and form.

For satisfactory production of closed cell foams, the blowing agent's solubility should be sufficiently high, while the mixture is passing through the die into the lower pressure expansion zone, so that expansion proceeds smoothly to the closed cell state. Otherwise, if the solubility is too low the blowing agent vaporizes away prematurely—and so rapidly and to such an extent before the cell walls fully form—that the resulting foam contains a high proportion of ruptured cells (voids), which adversely affects the foam's utility, e.g., as insulating or load-bearing structural material. The blowing agents solubility in the resin is particularly critical when extruding through large cross-sectional dies. This is because the throughput of the extruding mixture is generally fixed in conventionally employed extruders and the back-pressure at the lip (opening) is low. The larger the area of the die opening the lower is the back-pressure exerted on the mixture and the greater is the number of voids in the resulting foam.

There are many conventional methods for making thermoplastic foams. Siraux et al, European Patent Application No. 0 406 206 A2 discloses polystyrenic foams and a method of making them involving a mixture of blowing agents comprising dichloromethane and one or more of a hydrochlorofluorocarbon (HCFC), a hydrofluorocarbon (HFC) and a fluorocarbon (FC), with dichloromethane comprising 5 to 25 weight percent of the mixture. The disclosed system has the disadvantage of utilizing and requiring environmentally objectionable (e.g., ozone depleting) chloro-containing volatile substances as part of the blowing agent composition.

Suh et al, Canadian Patent No. 1,086,450, relates to polystyrenic closed cell insulating foams and their preparation, utilize a mixture of high permeability and low permeability blowing agents for foam production. These foams are undesirable because they require high proportions of objectionable flammable and/or chloro-containing high permeability blowing agents.

Suh, U.S. Pat. No. 5,011,866, discloses blowing agents comprising at least 70 weight percent HFC-143a (1,1,1-trifluoroethane) or HFC-134a (1,1,1,2-tetrafluoroethane) for the preparation of polystyrenic insulating foams having small closed cells, low densities (1 to 6 pounds per cubic foot) and high dimensional stabilities among other properties. HFC-143a is objectionable for its flammability, and HFC-134a presents processing difficulties as indicated in York U.S. Pat. Nos. 5,146,896 and 5,204,169.

Omire et al, U.S. Pat. No. 5,145,606, disclose eleven categories of mixed blowing agents for foaming thermoplastics such as polystyrene and polyethylene. Included among the blowing agent mixtures are four that comprise a tetrafluoroethane, which may be HFC-134a and/or HFC-134 (1,1,2,2-tetrafluoroethane), mixed with one or more selected hydrochlorofluorocarbons (HCFC). Omire, however, teaches that HFC-134 and HFC-134a cannot be advantageously used alone as a blowing agent for thermoplastics, and tetrafluoroethane should be used in combination with at least one chloro-containing blowing agent.

Rubin et al, U.S. Pat. No. 5,314,926, describe blowing agents for polystyrene and other non-isocyanurate based foamable plastics comprising 1,1,1,2,3,3,3-heptafluoropropane (HFC-227ea) in combination with one or more hydrocarbons or partially halogenated alkanes, which may contain chlorine substituents or be chlorine free. The disclosed system has the disadvantage of requiring HFC-227ea, a high HGWP (0.6) material, i.e. environmentally objectionable, as part of the composition.

Volcker et al, U.S. Pat. No. 5,334,337, disclose high compression strength foam board prepared from polystyrene containing 5–16 weight percent of a blowing agent mixture containing an alcohol or ketone, carbon dioxide ($CO_2$) a $C_3$–$C_5$ hydrocarbon and fluorinated hydrocarbons. The disclosed technology is disadvantageous in that it includes at least one flammable component which is also a volatile organic compound (VOC); the usage of which is regulated in many countries.

Bartlett et al, U.S. Pat. No. 5,182,040, disclose azeotropic and azeotropic-like binary compositions of HFC-134 with HFC-152a (1,1-difluoroethane), dimethyl ether (DME) and selected halocarbons and hydrocarbons are useful as refrigerants, aerosol propellants and blowing agents for polymer foams.

SUMMARY OF THE INVENTION

The present invention provides a method of preventing or slowing down both the rate of intrusion or permeation of air into the closed cells of a polymeric foam as well as preventing or slowing down the escape of the blowing agent by permeation or migration out of the polymer foam cells. Thus, according to the present invention the effective rate of permeation of air and/or hydrohalocarbon across the polymeric phase of the foam is substantially reduced by virtue of the presence of a blocking agent. Further according to the present invention a blocking agent capable of hydrogen bond formation with the hydrogen-containing halocarbon is incorporated into the polymeric foam and thus tends to form hydrogen bonds with the blowing agent. This in turn dramatically reduces the permeation rate of the hydrogen-containing blowing agent retaining it in the foam. The presence of the blocking agent also functions to reduce entry of air into the polymer foam. By reducing the entry of air into insulating foam and simultaneously reducing the permeation of blowing agents out of insulating foam, the blocking agents according to the present invention produce foams which better maintain their insulating characteristics relative to foams made without these hydrogen bond forming agents.

Thus, the present invention provides in a closed cell thermoplastic or thermoset polymer foam characterized by a continuous polymeric phase and a discontinuous gaseous phase, the improvement comprising: (a) a gaseous phase comprising at least one hydrogen-containing halocarbon; and (b) an effective amount of a hydrogen bond forming blocking agent. Preferably the hydrogen bond forming blocking agent is an organic ether, ester or ketone and is preferably present in the range of from about 0.1 to about 20 weight percent based on the total weight of foam. Since the blocking agent according to the present invention can often be conveniently incorporated, marketed and used in combination with the blowing agent, the present invention further provides an improved thermoplastic or thermoset polymer foaming composition comprising:

(a) a hydrogen-containing halocarbon; and
(b) an effective amount of a hydrogen bond forming blocking agent.

The improved method according to the present invention involves, in a method of manufacturing an expanded polymeric foam wherein a blowing agent expands as the polymeric phase solidifies, the specific improvement comprising the steps of:

(a) selecting a hydrogen-containing halocarbon as the blowing agent; and
(b) adding an effective amount a hydrogen bond forming blocking agent to reduce the permeation of air into the foam or slow down the escape of blowing agent from of the foam.

It is an object of the present invention to provide a blocking agent that when incorporated into a polymeric foam will reduce or prevent the intrusion of air into the foam and/or the permeation or escape of blowing agent from the foam. It is a further object of the present invention to provide such a blocking agent that is particularly useful with the hydrogen-containing chlorofluorocarbons and hydrogen-containing fluorocarbons (i.e., the HCFCs and HFCs) in that the blocking agent will hydrogen bond with the hydrohalomethanes and hydrohaloethanes, thus significantly reducing their rate of permeation and escape from a closed cell polymeric foam. It is an associated object of the present invention to provide insulating foam containing a blocking agent and a method of manufacturing the same that exhibits preservation of the insulating properties over longer periods of times relative to the absence of the blocking agent.

The present instant invention further comprises the discovery that HFC-134 (1,1,2,2-tetrafluoroethane) is substantially as effective as HFC-152a as a blowing agent for thermoplastic resins with the added advantages over HFC-152a of affording nonflammability and lower permeability through thermoplastic resins. This is a surprising and unexpected result since those skilled in the art believe HFC-134 alone and an azeotrope thereof with HFC-152a have essentially no effect on the solid polystyrene. Further, HFC-134 is superior to its isomer, HFC-134a, as a blowing agent for such foams. HFC-134 can exert a lower solution pressures in the extrusion step thereby permitting HFC-134 to be utilized in conventional foam manufacturing equipment.

The aforementioned discovery solves problems in this field by providing improved thermoplastic insulating foams produced with the aid of effective environmentally friendly and nonflammable blowing agents, preferably in conventional equipment. The instant invention solves a further problem by providing foams suitable for use as insulating and structural elements wherein the blowing agents also exhibit acceptably low permeabilities through the thermoplastic resins, sufficient for improved long-term insulating values. The instant invention solves these problems by providing an effective, environmentally friendly and nonflammable blowing agents for producing foam materials for food packaging and food service; normally by employing in conventional foam manufacturing equipment.

In one aspect, the invention comprises a closed, i.e., noninterconnecting, cell thermoplastic resinous foam body produced by means of an environmentally friendly nonflammable and low permeability polyfluorocarbon blowing agent composition comprising or consisting essentially of more than about 70 weight percent 1,1,2,2-tetrafluoroethane (HFC-134) and being substantially completely devoid of components having halogen substituents other than fluorine. The instant invention can be employed to obtain closed-cell foams having a wide range of characteristics. The cells of the foam typically have an average cell size of from about 0.1 to about 1.5 millimeters (mm) when measured across a minimum cross-sectional dimension of the body. The foam body typically has a minimum cross-section dimension (thickness) of at least about 0.04 inch (1 mm), a cross-sectional area of at least about 2 square inches (13 square centimeters) and a density of from about 0.75 to 15 pounds per cubic foot (pcf or 12 to 240 kilograms per cubic meters). Normally, the foam has a thickness of at least about 0.5 inch (1.27 cm), typically at least about 1.0 inch (2.54 cm), and usually at least about 1.5 inches (3.9 cm). The cross-sectional area of the foam body can be at least about 4 square inches (26 square centimeters), usually at least about 8 square inches (52 square centimeters) and normally at least about 16 square inches (104 square centimeters). While the density of the foam body is dependent upon many variables, the density is typically at least about 1.5 pcf (24 Kg/m$^3$), normally at least about 3 pcf (48 Kg/m$^3$) and usually at least about 6 pcf (96 Kg/m$^3$).

The foam body can be comprised of any suitable thermoplastic resin. While HFC-134 can be employed with a virtually unlimited array of resins, the thermoplastic resin is normally, polystyrenic; but, polyethylenic or polypropylenic can also be employed. Further details regarding the composition of the foam body as well as the components/systems that are used for forming the foam body can be found in "Modern Plastics Encyclopedia '92," Volume 68, Number 11; Chapters on: "Primary Processing," "Chemicals and Additives"; the disclosure of which is hereby incorporated by reference.

The foam body is normally produced by (a) forming a substantially homogeneous molten mixture of the normally solid thermoplastic resin and an effective foaming amount of the blowing agent at a nonfoaming elevated temperature and pressure, (b) extruding the mixture through a die into an expansion zone at a controlled foaming temperature and reduced pressure at a controlled rate effective to form a closed cell substantially void free foam body, (c) allowing the foam body to cool and increase in viscosity at temperatures and pressures such that there is obtained a substantially closed cell foam body having cell size dimensions an density as defined above at ambient temperatures and atmospheric pressure. The specific process conditions for obtaining the substantially closed cell body are understood by a skilled person in this art.

In one aspect the invention comprises sheets of relatively low density closed cell foam body suitable for use as a thermoformable starting material for the producing food-packaging materials. One suitable technique for making such foams are described in U.S. Pat. No. 5,204,169; the disclosure of which is hereby incorporated by reference. Another aspect comprises a relatively thick and high density foam body suitable as insulation, for example, in the form of boardstock in building constructions. In a further aspect the invention comprises higher density closed cell insulating foams suitable for use as structural members. The insulating foam bodies of the invention are further characterized as exhibiting low blowing agent permeabilities, e.g., low loss of blowing agent, thereby improving thermal insulation value of the foam over time as measured by its K-factor.

The blowing agent composition for use in this invention consists essentially of HFC-134 alone or as substantially nonflammable environmentally friendly mixtures thereof containing less than about 30 weight percent of other compatible blowing agents that are devoid of halogen substituents other than fluorine. Such blowing agents normally have 1 to 2 carbon atoms and are not classified as photochemically reductive VOCs (volatile organic compounds). That is, the blowing agent composition is substantially nonflammable, has zero ozone depletion potential (ODP) and low halocarbon global warming potential (HGWP) or "greenhouse effect". In some cases, it may be desirable to employ HFC-134 in conjunction with one or more additive or co-blowing agents selected from the group consisting of HFC-134a (1,1,1,2-tetrafluoroethane), HFC-152a (1,1-difluoroethane), HFC-143a (1,1,1-trifluoroethane), HFC-32 (difluoromethane), HFC-125 (pentafluoroethane), among others. Normally, in terms of weight percent the amount of additive blowing agent corresponds to less that about 22, usually less than about 13, and typically substantially nil, based on the total weight of the blowing agent composition. The inventive blowing agent includes azeotropic and azeotrope-like mixtures of HFC-134 with said co-blowing agents. An example of such azeotropes includes the flame resistant and nonflammable mixtures of HFC-134 with HFC-152a within the range of 78 weight % or more of HFC-134 and 22 weight % or less of HFC-152a, and normally within the range of 87 weight % or more of HFC-134 and 13 weight % or less of HFC-152a. Examples of such nonflammable mixtures are also disclosed in the aforementioned Watanabe et al, EP 483 573A1 and Bartlett et al. references.

By an "effective blowing agent foaming amount" it is meant an amount sufficient to result in foam body having the properties described herein. Normally, an effective amount will range from about 1 to about 30 weight percent based on the total weight of the resin blowing agent composition, usually about 2 to about 20, and typically about 2 to about 10 weight percent. The specific effective amount of the blowing agent will depend upon the particular type and grade of resin being employed and the desired resultant properties.

By a "closed cell substantially void-free foam body" it is meant a foam with a substantially uniform cell structure which has greater than about 50% closed cells, preferably greater 90% closed cells as measured by ASTM D2856-70.

By "nonflammable" it is meant to refer to satisfying the criteria set forth in ASTM E6871-85 with modifications listed in draft form, November 1993, by ASTM Committee E27 or by ASTM E918; hereby incorporated by reference.

By "low halocarbon global warming potential (HGWP) effect," it is meant a blowing agent having an HGWP value of about 0.50 or less, usually less than about 0.32 and typically less than about 0.30 as determined by the method described by D. A. Fisher et al, NATURE, 1990, 344, p.513; hereby incorporated by reference.

Cell sizes of the foam are determined by ASTM method D2842-69, and foam dimensional stabilities by ASTM D2126/C758.

Foam densities are determined by ASTM D1622-83. The invention is based on the discovery that contrary to expectations HFC-134: (1) is superior to its isomer HFC-134a as blowing agent for thermoplastic foams, in that it and mixtures thereof exert substantially lower solution pressures (higher solubilities in the resin phase) over the range of temperatures and pressures employed in extruding the compositions as foams such that HFC-134 may be used in conventional equipment without modification to produce substantially void-free closed cells; (2) alone or as mixtures thereof produce high quality closed cell foams having desirably small cell sizes over a wide range of densities, dimensional stability and low permeability through thermoplastic film, thus providing long-lived insulating and structural foams; (3) is superior to HFC-143a and HFC-152a, which are recommended in the art for use in producing thermoplastic insulating foams, in that HFC-134 and mixtures thereof have lower permeability through thermoplastic film thereby providing improved insulating characteristics while offering the added advantages of being nonflammable; (4) if alone or in combination with other environmentally friendly hydrofluorocarbon blowing agents can be an acceptable replacement of such heretofore commercially employed blowing agents for thermoplastic foams such as CFC-11, CFC-12, HCFC-22 and HCFC-142b.

Fulfillment of these objects and the presence and fulfillment of additional objects will be apparent upon complete reading of the specification and the claims.

DETAILED DESCRIPTION

Figure 1:
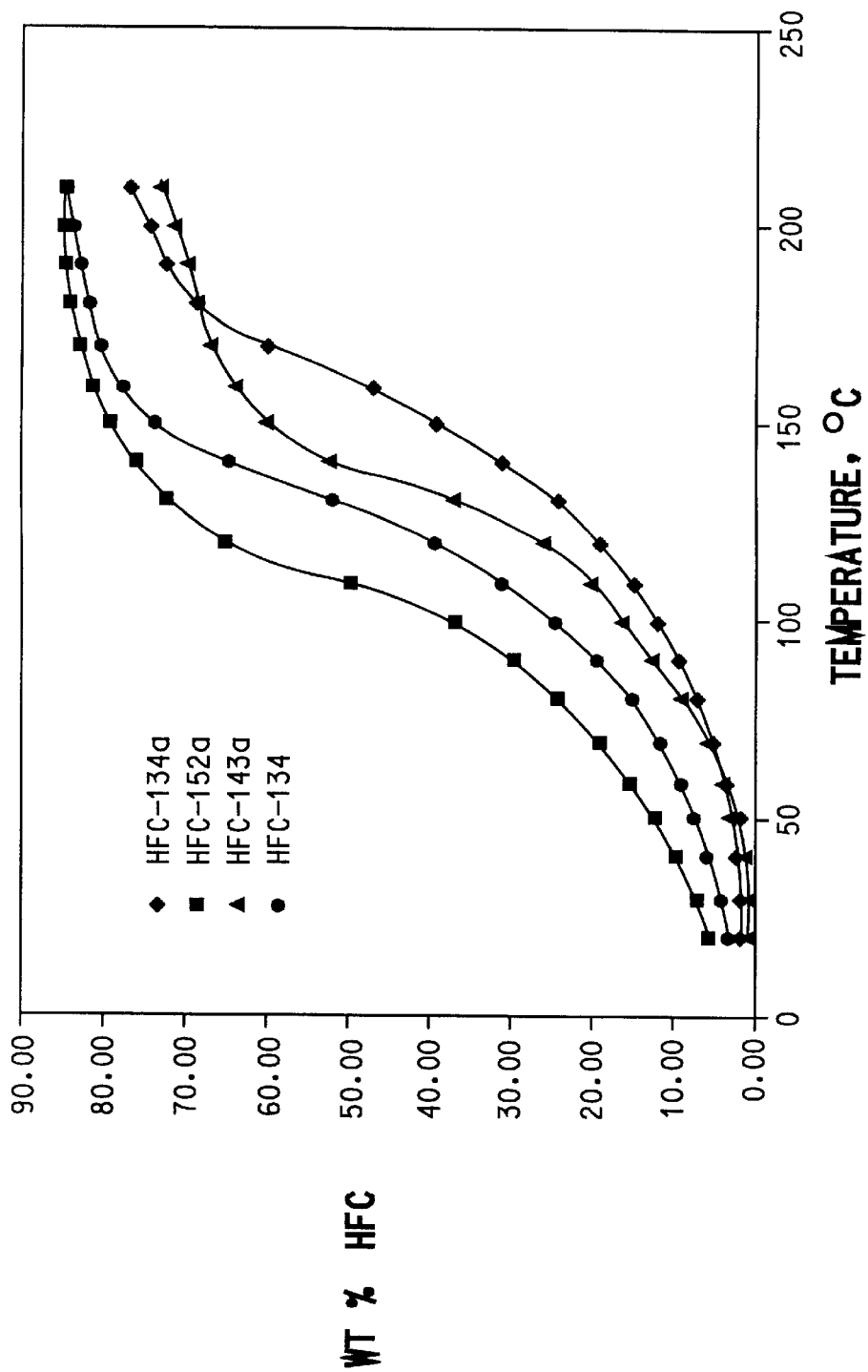
FIG. 1 graphically represents the solubilities in a typical normally solid polystyrenic resin of the inventive HFC-134 in comparison to HFC-134a, HFC-152a and of HFC-143a over a wide of range of temperatures embracing extrusion temperatures useful in the foam-producing process of the invention.

Polymer foams typically involve a continuous or at least a contiguous phase in a cellular structure. This cellular structure can be either flexible or rigid and is categorically either an open cell structure (i.e., the individual cells are ruptured or open producing a soft, porous "sponge" foam which contains no blowing agent gas) or a closed cell structure (i.e., the individual cells contain blowing agent gas surrounded by polymeric sidewalls with minimum cell-to-cell gas flow). Thermally insulating foams are closed cell structures containing a blowing agent gas (i.e., a gas formed in situ during the foam manufacturing process). Preferably the blowing agent gas should have a low vapor thermal conductivity (VTC) so as to minimize conduction of heat through the insulating foam. Thus, the vapor thermal conductivities for halocarbons such as CFC-11, CFC-12 and hydrochlorodifluoromethane, $CHClF_2$ (HCFC-22), at 25° C. (i.e., 45.1, 55.7 and 65.9 $Btuoft^{-1}ohr^{-1}oF^{-1} \times 10^4$, respectively) compare favorably to the VTC for air at 25° C. (i.e., 150.5 $Btuoft^{-1}ohr^{-1}oF^{-1} \times 10^4$). From these data, it ca readily be seen that the presence of a halocarbon blowing agent is required for optimum thermal insulation properties with both thermoplastic and thermoset foams.

A problem with hydrogen-containing alternative blowing agent HCFC-22 is its rapid migration from thermoplastic foams. For example, in the case of one grade of polystyrene, the permeation rate at 25° C. for CFC-12 vs. HCFC-22 was $4.2 \times 10^{-9}$ g/hr vs. $6.5 \times 10^{-8}$ g/hr (i.e., HCFC-22 diffused 15.5 times faster than CFC-12). Without some way to prevent or slow down the rate of HCFC-22 permeation from polystyrene foam, this blowing agent is unacceptable for producing good insulation foam, using this particular grade of polystyrene.

HCFC-22 is also known to diffuse rapidly from some polyurethane/polyisocyanurate foam formulations. Techniques for slowing/preventing this blowing agent migration are required if the halocarbon is to be useful in preparing these thermoset insulating foams.

In addition to the undesirable degradation of foam insulation value caused by permeation losses of blowing agent, the effect of air entry from the atmosphere into the foam cells is at least equally significant. As air enters the foam cells, the vapor thermal conductivity of the cell gas increases and the insulation value drops.

The blocking agents of this invention unexpectedly function to reduce air entry into foams and/or to reduce the permeation of hydrogen-containing blowing agents such as HCFC-22 from the foam cells, thereby producing more effective/economical insulation foams.

For the purposes of the present invention, the term "blocking agent" is used herein to denote hydrogen bond forming compounds which contain ether, ester or ketone groups or the like. These hydrogen bond forming compounds can bond or associate with hydrogen-containing halocarbon blowing agents such as HCFC-22 and thereby reduce their rates of permeation from the foam.

Unexpectedly, HCFC-22, difluoromethane ($CH_2F_2$, HFC-32), 1,1,1-trifluoro-2,2-dichloroethane ($CHCl_2CF_3$, HCFC-123), 1,1,2-trifluoro-1,2-dichloroethane ($CHClFCClF_2$, HCFC-123a), 1,1,1,2-tetrafluoro-2-chloroethane ($CHClFCF_3$, HCFC-124), pentafluoroethane ($CHF_2CF_3$, HFC-125), 1,1,2,2-tetrafluoroethane ($CHF_2CHF_2$, HFC-134), and 1,1,1,2-tetrafluoroethane ($CH_2FCF_3$, HFC-134a) have been observed to associate or hydrogen bond with compounds containing ether, ester or ketone groups. Glycols and other polyhydroxy compounds tend to form intra- or inter-molecular hydrogen bonds with themselves and thus do not associate strongly with HCFC-22. HCFC-22, with hydrogen bonding esters, ketones or ethers, exhibits dramatically reduced vapor pressure as a result of the association. Furthermore, when these hydrogen bonding compounds are present in thermoplastic polymers such as polystyrene, the permeation of HCFC-22 is reduced/slowed as the result of the mutual association which occurs between these compounds. The hydrogen bond forming agents additionally function to improve the solubility of blowing agents such as HFC-134a in thermoplastic polymers such as polystyrene.

Also, the mutual solubility of HCFC-22 and HCFC-123 or the like with several hydrogen bond forming compounds further provides evidence of an unexpected association between these materials. CFC-12 does not share this unexpected solubility characteristic. because of the solubility of many of the hydrogen bond forming compounds in HCFC-22, these compounds are suitable for dissolving in HCFC-22 and, thus, can be made commercially available in this convenient form.

For purposes of the present invention and as previously mentioned, the blocking agent can broadly be any compound that contains either an ether, ester or ketone group or combinations of the same and is capable of hydrogen bonding or the equivalent strong association or complexing with hydrogen-containing halocarbons. For example, but not by way of limitation, the following table lists examples of ether, ester or ketone groups containing compounds which associate or hydrogen bond with hydrogen-containing halocarbons such as HCFC-22.

HYDROGEN BONDING AGENTS (1) Polyethylene oxide polymers
(2) Ethylene oxide/propylene oxide copolymers
(3) Polypropylene oxide polymers
(4) Polyethylene glycol mono- and dioleates
(5) Polyethylene glycol monostearates
(6) Alkylphenoxy polyethoxy ethanols
(7) Polyethylene oxide sorbitan monostearates and tristearates
(8) Polyethylene oxide fatty acid amides
(9) Primary and secondary alcohol ethoxylates
(10) Glyme, diglyme, triglyme and tetraglyme
(11) Mono-, di- and tripropylene glycol methyl ethers and ether acetates
(12) Dimethyl adipate, succinate and glutarate
(13) Ethylene oxide/propylene oxide adducts with a sucrose
(14) Ketones and polyketone polymers.

The use of hydrogen-containing blowing agents such as HCFC-22 with ether, ester or ketone hydrogen bond forming compounds in polymer foams does not preclude the simultaneous incorporation of blowing agents such as 1,1-dichloro-1-fluoroethane ($CCl_2FCH_3$, HCFC-141b), 1-chloro-1,1-difluoroethane ($CClF_2CH_3$, HCFC-142b), 1,1,1-trifluoroethane ($CF_3CH_3$, HFC-143a), 1,2-difluoroethane ($CH_2FCH_2F$, HFC-152), and 1,1-difluoroethane ($CHF_2CH_3$, HFC-152a) which do not tend to form strong hydrogen bonds. It should be further appreciated that various CFCs may also be present as a component of a blowing agent mixture useful according to the present invention and that the present invention is applicable when $CO_2$, hydrocarbons or methyl formate are components of the blowing agent gas. Similarly, various additives such as stabilizers, dyes, fillers, and the like can be present in the blowing agent.

In addition to reducing the entry of air into and/or the migration of hydrogen-containing blowing agents such as HCFC-22 from thermoplastic foams, the hydrogen bond forming agents may provide other functions to the foam manufacturing process. For example, compounds such as the polyethylene oxide polymers may provide lubricity and thereby increase the extrusion throughput or production rate. Furthermore, these compounds are contemplated as potentially useful as polymer plasticizers and may contribute advantageously to other properties.

The hydrogen bond forming agents of this invention are suitable for use with thermoplastics such as polystyrene, polyethylene, polypropylene, polyvinyl chloride, and the like to prevent loss of hydrogen-containing blowing agents; however, they can also be used with thermoset polymer foams such as polyurethane, polyisocyanurate, and phenolic resin foams. Since these hydrogen bond forming agents associate with blowing agents such as HCFC-22, they will function to reduce/prevent permeation of the blowing agent in any compatible polymer foam system. Furthermore, these hydrogen bond forming agents will function in the presence of other additives normally used in polymer foams, such as stabilizers, dyes, fillers, and the like.

The blowing agent concentration used to prepare most conventional thermoplastic and thermoset polymer foams is generally in the range of about 5 weight percent to about 30 weight percent (based on total weight of the foam). To reduce migration of hydrogen-containing blowing agents such as HCFC-22, the effective use concentration of hydrogen bond forming agent is at least about 0.1 weight percent and preferably from about 1.0 to 20 weight percent (based on total formulation weight), most preferably about 0.5 weight percent to about 10 weight percent. Typically, the improved polymer foaming composition will contain from 1 to 100 parts by weight hydrogen bond forming blocking agent for every 100 parts of hydrogen-containing halocarbon blowing agent.

The actual method by which the blocking agent according to the present invention is to be incorporated into the closed cell foam can vary according to the specific application and composition being employed. In the broadest sense, the blocking agent can be treated as any other foam additive as generally known in the art. As previously stated, the blocking agent in certain applications imparts beneficial effects to the polymer phase in addition to reducing permeability and in such cases the blocking agent can be added to the polymer. Since the blocking agent is categorically a hydrogen bond forming compound, it may be advantageously added to the blowing agent or preblended into the polymer (e.g., polystyrene) prior to extrusion or other method of fabrication. In the case of thermoset foams (e.g., polyurethane/polyisocyanurate foams) the hydrogen bond forming agents can be added to the foam in the isocyanate (A-side) or the polyol (B-side) or added with the blowing agent at the mixing head where the A-side and B-side are combined (i.e., third-streamed). If the hydrogen bond forming agent used contains free hydroxyl groups, this must be taken into account when calculating the hydroxyl equivalent for the B-side system. In the case where the blocking agent is preferentially more soluble in one of the foam components, it is preferably added to that component. For example, addition of the blocking agent to the polyol component of two-component thermoset resin is preferred. Of course, the addition to more than one component or either component is also contemplated. In the case of phenolic foams, the hydrogen bond forming agents can be added to the foam by preblending into the resole or added separately at the mixing head prior to the foam laydown. The most preferred method of adding the blocking agent is to mix it with the blowing agent and as such the admixture of HCFC or HFC and blocking agent is contemplated as being a commercially attractive product, per se.

One further aspect of the present invention comprises a substantially solid closed cell thermoplastic insulating foam body wherein the cells are substantially completely filled with a substantially nonflammable blowing agent comprising more than about 70 weight percent of HFC-134, the balance, if any, of the blowing agent comprising one or more components that are devoid of halogen substituents other than fluorine, and have low HGWP values. Examples of suitable blowing agent components for use with HFC-134 include hydrofluorocarbons comprising at least one of HFC-134a, HFC-143a, HFC-152a, HFC-32, HFC-125, azeotropic and azeotrope-like mixtures with HFC-134, e.g., as described above, among others. Other acceptable blowing agent components that may be used in conjunction with HFC-134, with or without the other HFC components, comprise at least one of $N_2$, $CO_2$, argon, other rare gases, among others. Hydrocarbons and other VOC compounds are desirably absent.

Normally, the HFC-134 content of the blowing agent composition is at least about 78% by weight, usually at least about 87, and desirably about 100 percent. Typically, the average cell size is less than about 1.5 mm, and normally not more than about 1.2 mm. When the foam is employed as an insulating body, the thickness can be between about 0.04 and about 6 inches (1 to 152 mm), and the foam density from about 0.75 to about 15.0 pounds per cubic foot (12 to 240 kilograms per cubic meter). Consequently, the foam of the instant invention provides small cells, is obtained by using a low permeability environmentally friendly blowing agent (s), and provides long-term insulating properties to thermoplastic foam bodies while excluding release of ozone-depleting halocarbons and smog-producing volatile organic compounds into the atmosphere.

The polystyrenic resinous component of the invention foam products, sometimes referred to in the art as "styrenic resin", may vary widely in chemical composition. Broadly included as resins that can be employed in the instant invention are solid thermoplastic polymers of one or more polymerizable alkenylaromatic compounds. The polymer or copolymer comprises in chemically combined form at least one alkenylaromatic compound having the general formula Ar—C(R)=CH$_2$, wherein Ar represents an aromatic hydrocarbon radical of the benzene series, typically phenyl, and wherein R normally represents hydrogen (preferably) or a methyl radical. While any suitable alkenyl aromatic resins can be employed, examples comprise the solid homopolymers of styrene, alpha-methylstyrene, o-methylstyrene, m-methylstyrene and p-methyl styrene; also the solid copolymers of two or more such alkenylaromatic compounds, among others. The polymers may also include in copolymerized form relatively minor proportions of other polymerizable olefinic compounds, such as, for example, methyl methacrylate, acrylonitrile, methacrylic acid, acrylic acid, maleic anhydride, among others. Without wishing to be bound by any theory or explanation, it is believed that the non-styrenic monomers can contribute via their oxygen and nitrogen containing moieties polymer sites for solvating HFC-134 (and other hydrofluorocarbon components of the blowing agent) during the step of mixing polystyrenic resins blowing agent blends prior to foaming. A desirable polystyrenic resin comprises the solid homopolymer, polystyrene, due to its low cost and readily availability. Other thermoplastic resins can be foamed with the HFC-134 based blowing agent composition, including polyolefinic compounds, for example, polyethylene, polypropylene, mixtures thereof, among others.

The thermoplastic foam bodies of this invention are conveniently produced by using conventional equipment comprising an extruder and associated means for (1) melting the resin; (2) homogeneously blending the blowing agent composition with the melt to form a plasticized mass at nonfoaming temperatures and pressures; (3) passing the plasticized mass at a controlled rate, temperature and pressure through a die having a desired shape, e.g., slit die for producing rectangular slabs of foam board having desired thickness and surface area, into an expansion zone; (4) allowing the extrudate to foam in the expansion zone maintainable at suitable temperatures and low pressures; (5) maintaining the expanding extrudate under such temperatures and pressures for a time sufficient for the viscosity of the extrudate to increase such that the cell size and density of the foam remain substantially unchanged and substantially free of ruptured cells at ambient temperature, e.g., 25° C. and atmospheric pressure; and (6) recovering the extruded foam body.

In one aspect of the invention, the foaming amount of the blowing agent is in the range of from about 1 to about 30 weight percent based on the total weight of the resin plus blowing agent mixture, typically about 2 to about 20 weight percent, and normally about 2 to about 10 weight percent. The relatively lower the concentration of blowing agent, the greater the density of the resulting foam. The proper amount of blowing agent or resultant characteristics of the foam for any desired end-use are readily determined by a skilled person in this art who has reviewed and understood the instant invention. The resin is melted at a temperature of about 200 to about 235° C. depending upon the grade employed, and at nonfoaming pressures of about 600 psig or higher. The plasticized resin-blowing agent mixture is cooled under nonfoaming pressure to a temperature of about 115 to 150° C., normally 130° C., and extruded into the expansion zone at or below ambient temperature and at or below atmospheric pressure.

When preparing foams of this invention, it is often desirable to add a nucleating agent or other additive into the resin. Nucleating agents serve primarily to increase cell count and decrease cell size in the foam, and may be used in an amount of about 0.1 to about 4 parts by weight per 100 parts by weight of the resin. Typical nucleating agents comprise at least one member selected from the group consisting of talc, sodium bicarbonate-citric acid mixtures, calcium silicate, carbon dioxide, among others. Other additives often also incorporated into the resin include, for example, colorants, antioxidants, lubricants, stabilizers, fire retardants, among others, depending upon the end use of the resin.

Representative foamed products that can be made in accordance with the present invention comprise: (1) polystyrene foam sheet for the production of disposable thermoformed packaging materials, e.g., as disclosed in York U.S. Pat. No. 5,204,169; (2) extruded polystyrene foam boards for use as residential and industrial sheathing and roofing materials, which may be from about 0.5 to 6 inches (1.25 to 15 cm) thick, up to 4 feet (122 cm) wide, with cross-sectional areas of from 0.17 to 3 square feet (0.016 to 0.28 square meter), and up to 27 feet (813 meters) long, with densities of from about 1.5 to 10 pounds per cubic foot (pcf) (25 to 160 kilograms per cubic meter (kg/m$^3$)); (3) expandable foams in the form of large billets which may be up to about 2 feet (61 cm) thick, often at least 1.5 feet 46 cm) thick, up to 4 feet (1.22 meters) wide, up to 16 feet (4.8 meters) long, having a cross-sectional area of about 2 to 8 square feet (0.19 to 0.74 square meter) and a density of from 6 to 15 pcf (96 to 240 kg/m$^3$). Such foamed products are more fully described by Stochdopole and Welsh in the Encyclopedia of Polymer Science and Engineering, vol. 16, pages 193–205. John Wiley & Sons, 1989; hereby incorporated by reference.

Certain aspects of the invention are illustrated by the Figures. The accompanying figures illustrate the suitability of HFC-134 as blowing agent for producing polystyrenic foam bodies, the data presented therein were obtained with the aid of the well-known Flory-Huggins equation (Flory, P. J.: "Principles of Polymer Chemistry"; Cornell University Press, Ithaca, N.Y.), discussed below.

Referring now to the Figures, FIG. 1 is a plot of weight % material soluble in polystyrene resin vs. temperature which shows that the solubility of HFC-134, in comparison to other HFCs, in a representative polystyrene resin (having a glass transition temperature of 85° C. and a melting point of 105° C.) increases with increasing temperatures, as measured at the mixtures' equilibrium pressures. These equilibrium pressures relate to the point in the extrusion process where blowing agent is mixed with resin; foaming cannot occur at these pressures. FIG. 1 shows that the solubility of HFC-134 and HFC-152a in the selected resin are similar over the entire temperature range, and that their solubilities are significantly greater than those of HFC-134a and HFC-143a. HFC-134 and HFC-152a also show superior solubilities under extrusion conditions; data demonstrating such solubility are illustrated in FIGS. 3, 4, 5 & 6 and are abstracted below in Tables 1 and 2.

Referring now to FIGS. 3–6, FIGS. 3–6 relate to the solubility of superheated HFC-134 vapor in polystyrene resin at the following selected temperatures 20°, 60°, 140°, 180° and 220° C. at pressures as high as about 3000 psia. The data presented in FIGS. 3–6 were determined through use of the Flory-Huggins equation for phase equilibria in polymer solutions. This equation uses values for the following parameters [(1)–(4)], which were obtained as follows:

(1) liquid densities of the blowing agents, g/cc, were derived by using standard methods, drawing a straight line through the liquid density data (based on National Institute of Standards and Technology, NIST, experimental data; with equations based on the Modified Benedict-Webb-Rubin, MBWR, equation of state) from −50° C. to 50° C. and calculating the liquid density as a function of temperature. The density (d) equation recites: d=AT+B, wherein A is the slope of the line, B is the constant of the line, and T temperature (°C.). The liquid densities are (grams/cubic centimeter, g/cm$^3$):

| | Liquid Densities | | | | |
|---|---|---|---|---|---|
| Component | 50° C. | 85° C. | 100° C. | 120° C. | 150° C. |
| HFC-134 | 1.214 | 1.104 | | 0.994 | 0.888* |
| HFC-134a | 1.108 | 0.983 | | | 0.749 |
| HFC-152a | 0.819 | | 0.655 | 0.572 | |
| HFC-143a | 0.804 | | 0.645 | 0.553** | 0.460 |
| Resin*** | 1.056 | 1.051 | 1.041 | 1.025 | 1.011 |

*160° C.
**125° C.
***Arco Dylene*R* 8G Polystyrene, t.g. = 85° C., m.p. 105° C.

(2) The densities of the superheated vapors of the blowing agents, which are tabulated below, were calculated from the known vapor data of their thermodynamic properties (based on National Institute of Standards and Technology, NIST, experimental data; with equations based on the Modified Benedict-Webb-Rubin, MBWR, equation of state).

| | Superheated Vapor Densities (g/cm$^3$) | | | | |
|---|---|---|---|---|---|
| Component | 50° C. | 85° C. | 100° C. | 120° C. | 150° C. |
| HFC-134 | 0.04379 | 0.04497 | | 0.03830 | 0.04867* |
| HFC-134a | 0.03390 | 0.02975 | | | 0.03158 |
| HFC-152a | 0.02495 0.02942 | | 0.02281 | 0.03850** | |
| HFC-143a | 0.04611 0.04349 | 0.04386 | | 0.03204** | |

*160° C.
**125° C.

(3) The activity coefficients for the blowing agents that are tabulated below:

| Activity Coefficients | | | | |
|---|---|---|---|---|
| Temp. °C. | HFC-134 | HFC-134a | HFC-152a | HFC-143a |
| 50 | 0.877 | 0.605 | 0.728 | 0.537 |
| 85 | 0.447 | 0.273 | | |
| 100 | | | 0.277 | 0.238 |
| 120 | 0.218 | | | |
| 125 | | | | |
| 150 | | 0.112 | 0.174 | 0.133 |
| 160 | 0.116 | | | |

These coefficients were determined by dividing the experimental blowing agent partial pressure by the saturated vapor pressure at that temperature.

Figure 2:
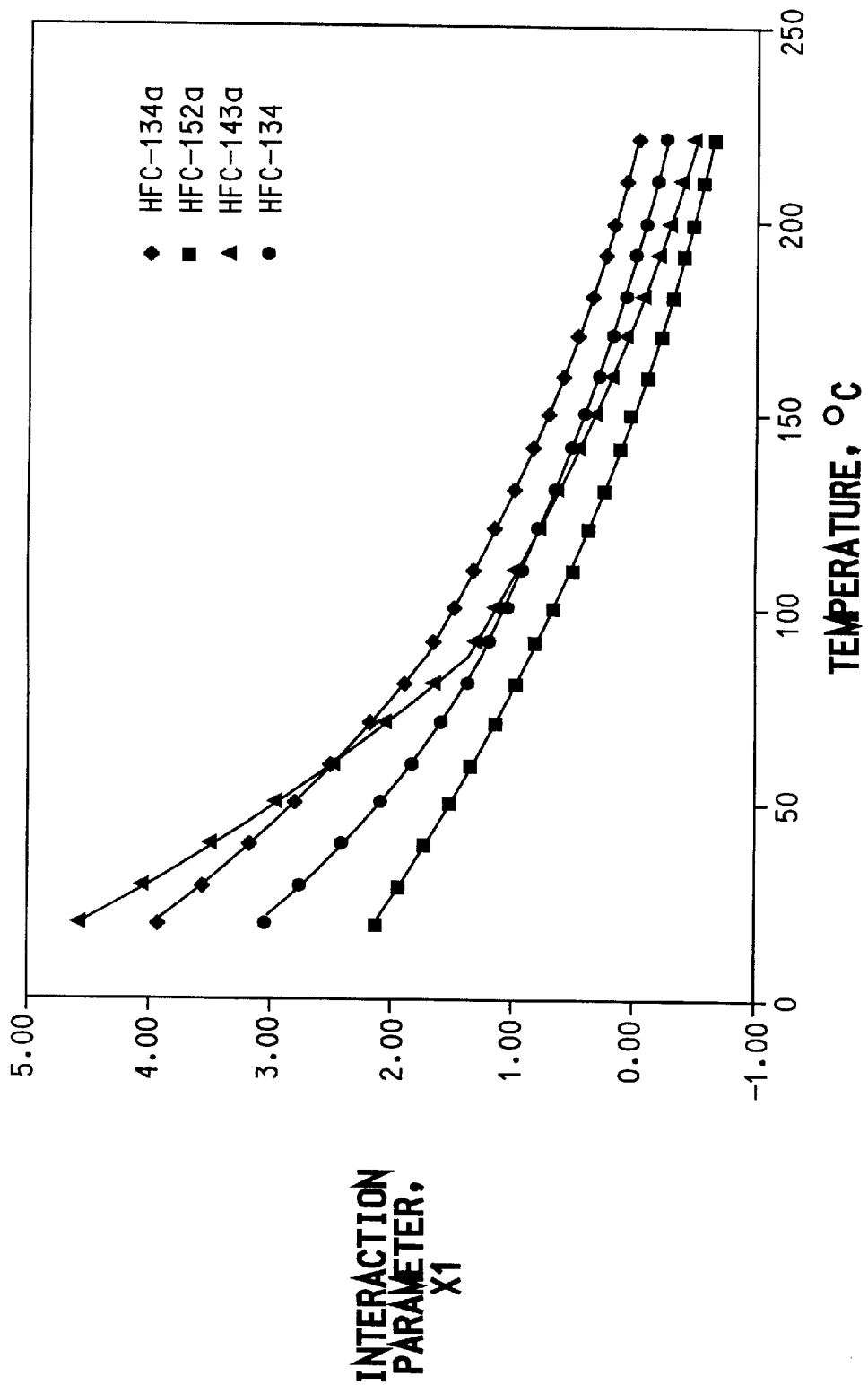
FIG. 2 graphically represents the interaction parameters of HFC-134, HFC-134a, HFC-152a and HFC-143a with polystyrene over a temperature range of 20 to 220° C.
Figure 3:
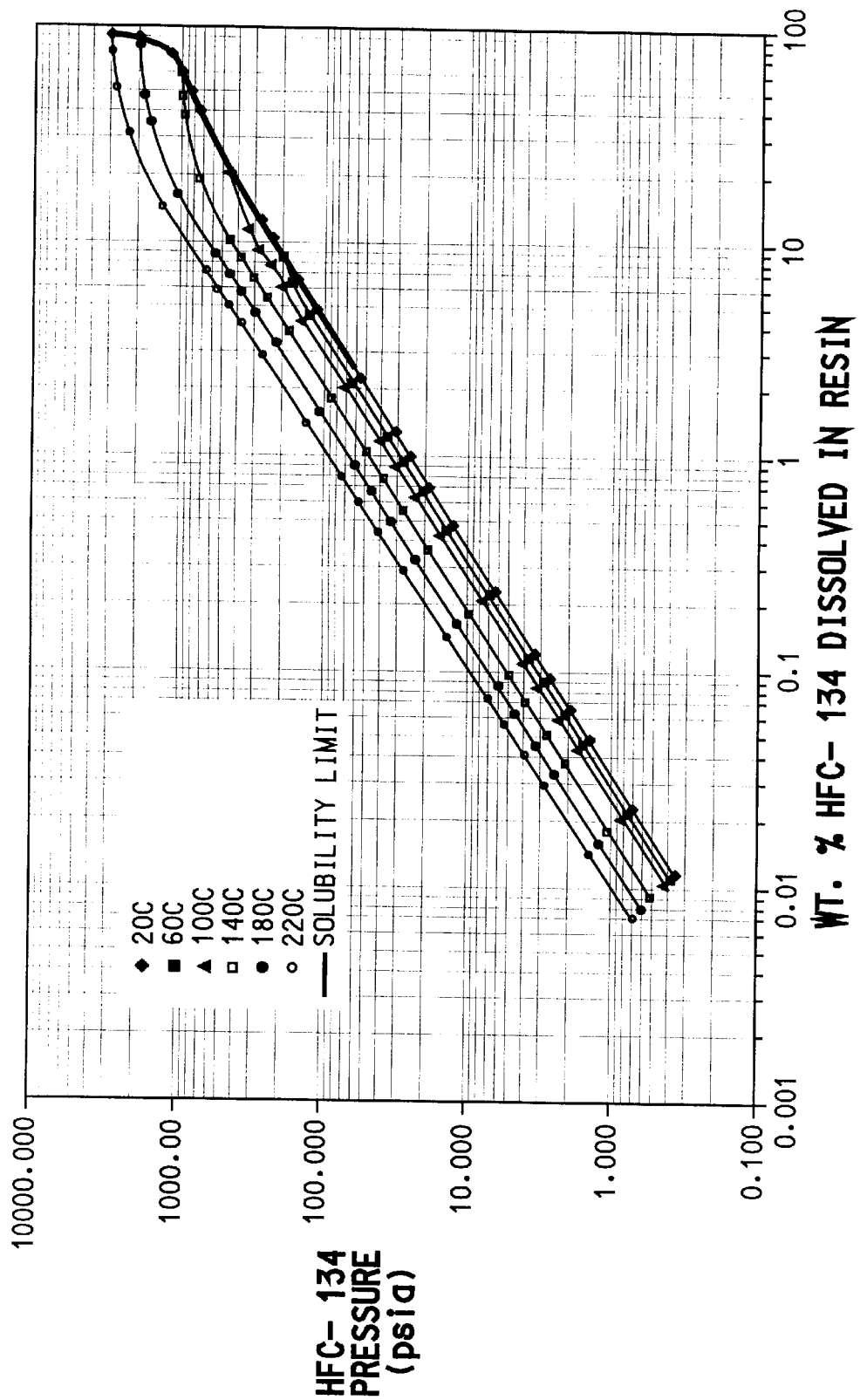
FIGS. 3, 4, 5, and 6 are log-log plots that relate to the solubility of HFC-134, HFC-134a, HFC-152a and HFC-143a, respectively, as superheated vapor in polystyrene resin over a 20 to 220° C. temperature range.
Figure 4:
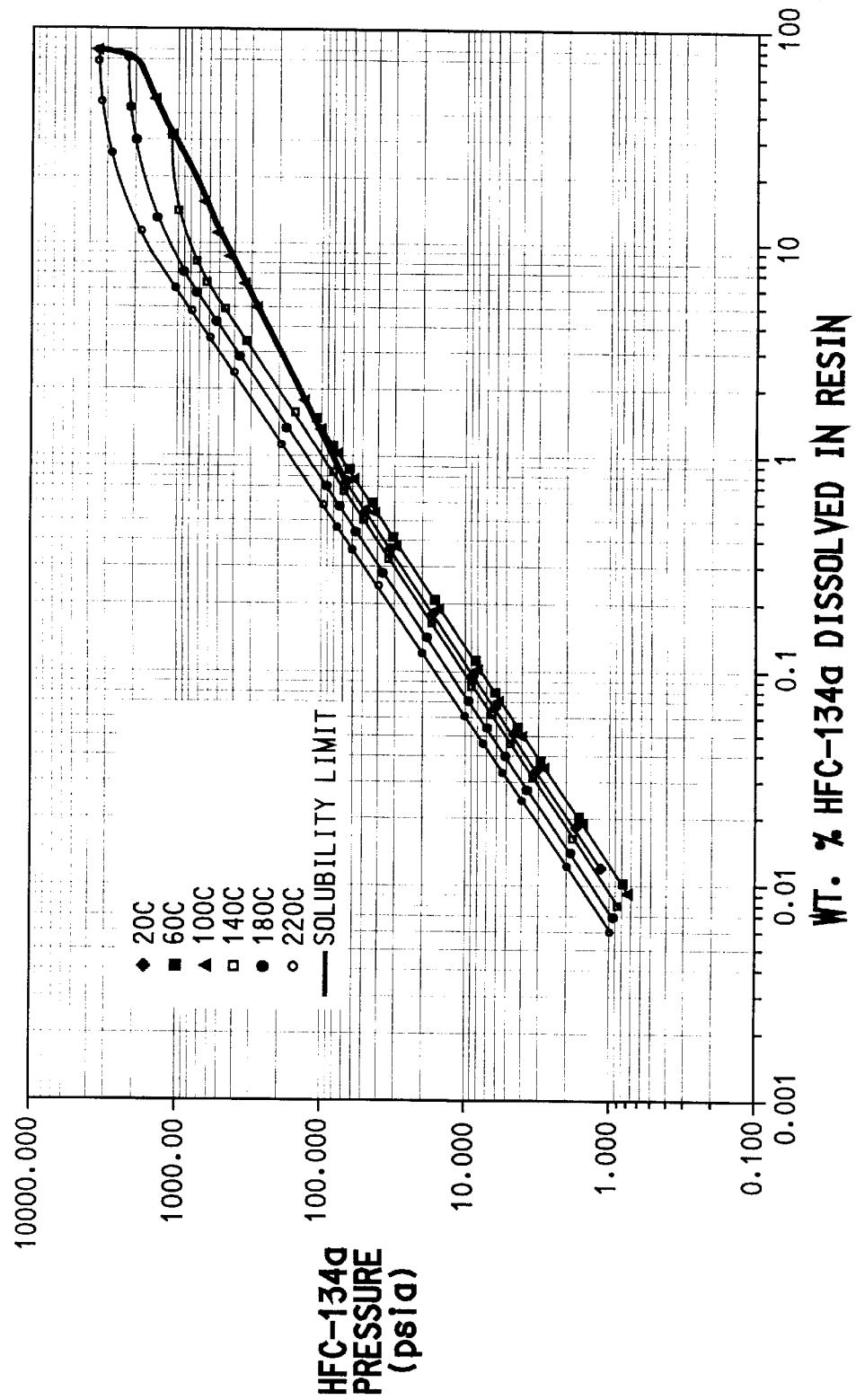
Figure 5:
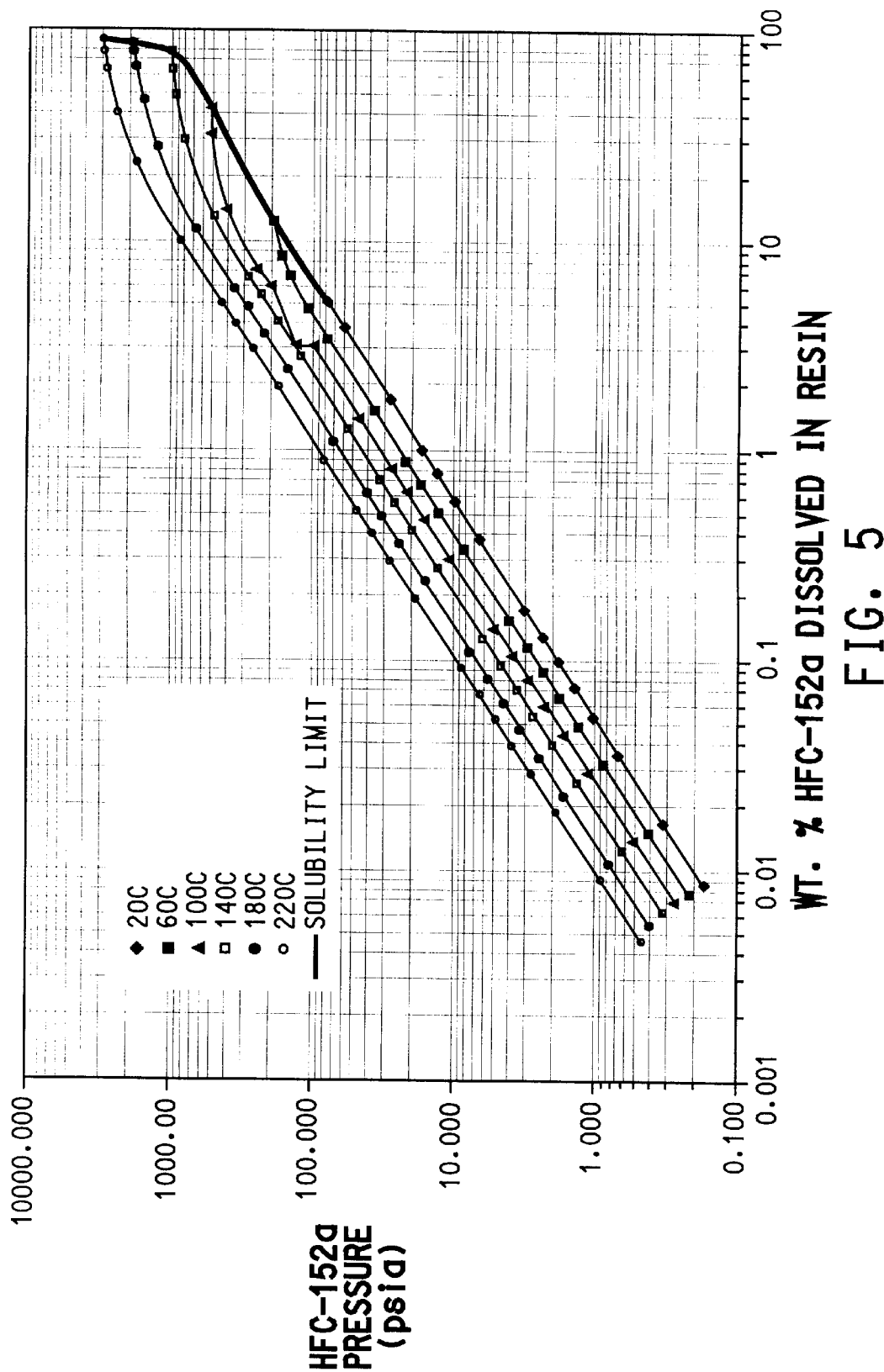
Figure 6:
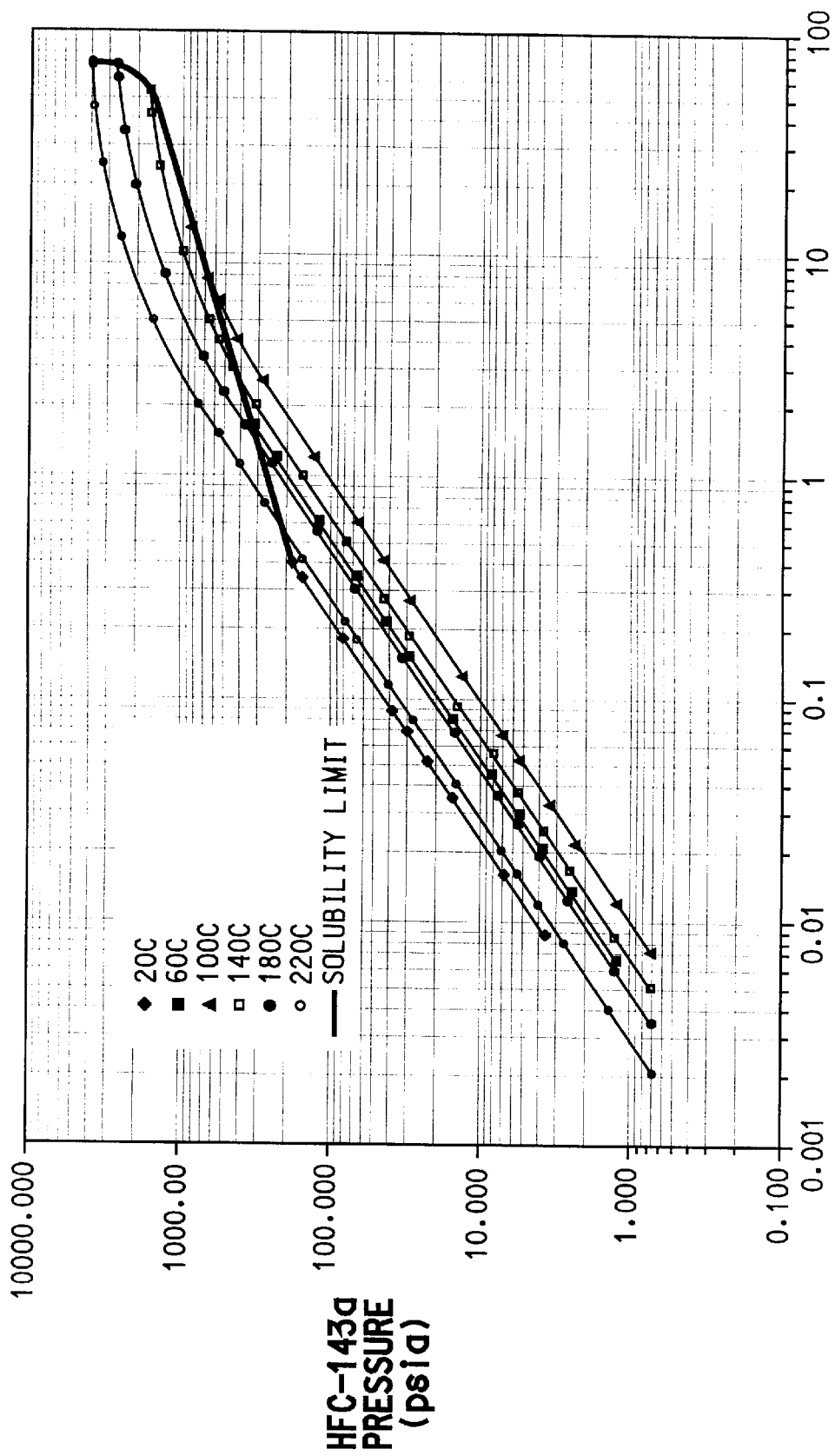

(4) The interaction parameters, X1, were determined at four temperatures, and are presented graphically as a function of temperature in FIG. 2 by means of the following equation and equation constants:

$$X1 = A/T + B \text{ (where } T = °K. = °C. + 273.2)$$

| Compound | A | B |
|---|---|---|
| HFC-134 (<85° C.) | 2553.95 | −5.75256 |
| HFC-134 (>85° C.) | 2075.829 | −4.44256 |
| HFC-143a (<85° C.) | 4641.477 | −11.5113 |
| HFC-143a (>85° C.) | 2450.138 | −5.40252 |
| HFC-152a (<85° C.) | 1944.713 | −4.51260 |
| HFC-152a (>85° C.) | 2013.858 | −4.64595 |

Representative X1 values are:

| Temp. °C. | HFC-134 | HFC-134a | HFC-152a | HFC-143a |
|---|---|---|---|---|
| 50 | 2.2 | 2.80 | 1.50 | 2.90 |
| 100 | 1.1 | 1.50 | 0.75 | 1.20 |
| 125 | 0.75 | 1.10 | 0.40 | 0.75 |
| 150 | 0.50 | 0.80 | 0.10 | 0.40 |
| 200 | −0.05 | 0.20 | 0.40 | −0.25 |

Referring now to FIG. 2, these data permit calculating the limiting and superheated solubilities of the blowing agents via the Flory-Huggins equation, utilizing the values of (1)–(4) above. Such data are presented graphically in FIGS. 3, 4, 5 and 6. FIGS. 3–6 are plots of "weight % Blowing Agent Dissolved in Resin vs. Pressure of Solution" as a function of temperature. Representative solubilities of the blowing agents in the given resin at various extrusion process temperatures at atmospheric pressure (14.7 psia), are listed below in Table 1:

TABLE 1

| WT % Blowing Agent Dissolves in Resin | | | | |
|---|---|---|---|---|
| Temp. °C. | HFC-134 | HFC-134a | HFC-143a | HFC-152a |
| 200 | 0.15 | 0.08 | 0.05 | 0.15 |
| 180 | 0.2 | 0.1 | 0.07 | 0.2 |
| 140 | 0.3 | 0.15 | 0.1 | 0.3 |
| 100 | 0.4 | 0.19 | 0.13 | 0.4 |
| 60 | 0.5 | 0.2 | 0.08 | 0.5 |
| 20 | 0.6* | 0.16* | 0.04 | 0.8 |

*25° C.

The Table 1 data indicate that during the extrusion foaming stage of foam production the solubility, respectively, of HFC-134 and HFC-152a in the resin per se, as distinct from the amount of such material in the cells of the resultant foam, progressively increase with decreasing temperature at a given foaming pressure. The same trend is evident upon examining the data from the Figures at the other pressures, e.g., 100 psia.

This resin solubility effect indicates that a better, more uniform foam will result. The HFC-134 (and HFC-152a) solubilities in the resin increase, i.e., solution pressures decrease, with decreasing temperature during extrusion. These characteristics are advantageous by providing conditions for foam formation which are conducive to closed cell production over a wide range of densities while minimizing the possibility of blown/ruptured cells.

The data in these Figures, show that the HFC-134/HFC-134a solubility ratio is substantially steady at a ratio of about 2/1 over the 200 to 100° C. temperature range during which the resin-blowing agent composition is substantially molten. The solubility ratio, however, increases at temperatures of about 60° C. and 20° C., which are below the melting and glass transition temperatures of the resin. These solubilities are surprising and unexpected, and when translated into the closed cell foam product correspond to a wide range of densities with fewer blow/ruptured cells.

The following Table 2 presents similar solubility data that demonstrates the superiority of HFC-134 and HFC-152a over the other blowing agents at an extrusion temperature of 180° C., in terms of the (1) higher limiting, i.e., maximum solubilities at the extrusion temperature, (2) the lower vapor pressures exerted by HFCs 134 and 152a at a 10 weight percent solubility in the resin, and; (3) the more favorable solubilities at 1 atmosphere pressure at both the extrusion temperature of 180° C. and the final at rest temperature of 25° C.

TABLE 2

| Blowing Agent | Extruder Temp °C. | Limiting Solubility (wt % HFC) | at Extruder T for 10% Load (psia) | Solubility (wt % HFC) at 1 Atm of HFC Pres. | |
|---|---|---|---|---|---|
| | | | | Ext Temp | 25° C. |
| HFC-134 | 180 | 81 | 630 | 0.2 | 0.54 |
| HFC-134a | 180 | 69 | 1000 | 0.11 | 0.16 |
| HFC-143a | 180 | 69 | 1370 | 0.07 | 0.04 |
| HFC-152a | 180 | 83 | 620 | 0.2 | 0.76 |

Similar results are obtained at higher and lower extrusion temperatures, e.g., 200° and 130° C.

TABLE 3

Solution Pressure of Blowing Agents in Polystyrene Resin at 140° C.

| Blowing agent | Concentration (wt % in resin*) | Solution Pressure (psia) |
|---|---|---|
| HFC-134 | 10.00 | 450 |
| HFC-134a | 10.00 | 740 |
| HFC-143a | 8.23 | 810 |
| HFC-152a | 6.47 | 340 |

*wt % adjusted to achieve molar equivalency

Employing a procedure identical to that detailed above on Quantum "Petrothene" grade low density polyethylene, the following Table 4 presents similar solubility data that demonstrates the superiority of HFC-134 over other fluorinated blowing agents at an extrusion temperature of 180° C., in terms of the (1) higher limiting, i.e., maximum solubilities at the extrusion temperature, (2) the lower vapor pressure exerted at 10 weight percent solubility in the resin, and; (3) the more favorable solubility at 1 atmosphere pressure at both the extrusion temperature of 180° C. and the final at rest temperature of 25° C.

TABLE 4

| Blowing Agent | Extruder Temp ° C. | Limiting Solubility (wt % HFC) | at Extruder Temp for 10% Load (psia) | Solubility (wt % HFC) at 1 Atm of HFC Pres. | |
|---|---|---|---|---|---|
| | | | | Ext Temp | 25° C. |
| HFC-134 | 180 | 81 | 621 | 0.20 | 0.64 |
| HFC-161* | 180 | 89 | 600 | 0.24 | 0.22 |
| HCFC-114** | 180 | 78 | 324 | 0.38 | 2.01 |
| HFC-134a | 180 | 74 | 828 | 0.14 | 0.22 |

*HFC-161 is 1-fluoroethane (CFH$_2$CH$_3$)
**HCFC-114 is 1,2-dichloro-1,1,2,2-tetrafluoroethane (CClF$_2$CClF$_2$)

EXAMPLES

The following examples are presented to further illustrate specific critical properties of various specific embodiments of the present invention, including vapor pressure, boiling point and permeation data, as well as similar properties, for comparison purposes, of systems and compositions outside the scope of the invention.

EXAMPLE 1

The solubilities of several representative hydrogen bond forming agents in HCFC-22 were determined for 10 wt. % solutions at ambient temperature (approximately 21° C.). The solutions were prepared by combining the hydrogen bond forming agents with HCFC-22 in 4 oz. plastic-coated pressure bottles. Solubility was determined by visual examination. Table 5 lists ten hydrogen bond forming compounds which are soluble to >10 wt. % in HCFC-22. These hydrogen bond forming agents are soluble in HCFC-22, HCFC-123 and HCFC-123a because of their bonding or association; whereas, they are generally insoluble in CFC-12. The hydrogen bond forming agents are also soluble in HCFC-141b.

Table 5

Hydrogen Bonding Agents Solubility in HCFC-22

The following hydrogen bonding agents are soluble at ambient temperature in HCFC-22 to >10 wt. %.:
Hydrogen Bonding Agents
  "PLURONIC" F-108
  "CARLOWAX" 3350
  "WITCONOL" H3SA
  "TRITON" X-67
  Polypropylene Glycol 2025
  "ETHOFAT" 0/20
  "ETHOMID" HT/60
  "TERGITOL" 15-S-20
  "ETHOX" DO-9
  "TERGITOL" NP-40
  * Solubilities determined at ambient temperature (approximately. 21° C.). Similar solubilities have been observed for HCFC-123, HCFC-123a, and HCFC-141b even though HCFC-141b is not a strong hydrogen bond forming HCFC.

EXAMPLE 2

Vapor pressure data were obtained for mixtures of CFC-12 and HCFC-22, respectively, with hydrogen bonding agents. In these tests, 30 grams of blowing agent was combined with 70 grams of hydrogen bond forming agent in a 4 oz. plastic-coated pressure bottles. After thermostatting the bottles at 21° C., the vapor pressures were determined using a pressure gauge accurate to 0.1 psi. Although NCFC-22 by itself has considerably higher vapor pressure at 21° C. than CFC-12 (121.4 psig vs. 70.2 psig), the formation of hydrogen bonds between the hydrogen bond forming agents and HCFC-22 resulted in dramatic vapor pressure depressions to values much lower than for CFC-12. The vapor pressure data are summarized in Table 6.

Boiling point data were obtained for a 30/70 blend Or HCFC-123/DBE. The data in Table 6A show an elevation in boiling point (relative to the value calculated from Raoult's Law) of 17° C. as the result of the association or hydrogen bonding which occurs between these materials. Similar boiling point elevations were observed for 30/70 blends of HCFC-123/DPM and HCFC-123/DPMA.

Table 6B shows vapor pressure data for HFC-32, HCFC-124, HFC-125, HFC-134 and HFC-134a with DBE, acetone, and 2-pentanone. Each hydrogen bond forming agent depresses the vapor pressure of the blowing agents.

TABLE 6

Effect of Hydrogen Bonding Agents on Vapor Pressure of HCFC-22

| Bonding Agent | Blowing Agent Wt. % | Vapor Pressure at 21° C. psig | |
|---|---|---|---|
| | | CFC-12 | HCFC-22 |
| None | 100.0 | 70.2 | 121.4 |
| "CARBOWAX" 3350 | 30.0 | 70.2 | 57.2 |
| "PLURONIC" F-108 | 30.0 | 70.2 | 55.5 |
| "WITCONOL" N35A | 15.0 | 44.0 | 20.0 |
| | 30.0 | 70.2 | 38.0(*) |
| "TRITON" X-67 | 15.0 | 70.2 | 29.5 |
| | 30.0 | 70.2 | 41.0 |
| "TWEEN" 61 | 30.0 | 70.2 | 70.5 |
| Polypropylene Glycol 2025 | 30.0 | 49.2(*) | 39.3(*) |
| "ETHOFAT" 0/20 | 30.0 | 57.5(*) | 35.0(*) |
| "ETHOMID" HT/60 | 15.0 | 70.2 | 18.5 |
| | 30.0 | 70.2 | 29.0 |
| "CARPOWAX" 8000 | 30.0 | 70.2 | 61.0 |
| Polyethylene Glycol Cpd 20N | 30.0 | 70.2 | 55.2 |
| "POLYOX" WSRN-10 | 30.0 | 70.2 | 56.5 |
| "TERGITOL" 15-S-20 | 15.0 | 70.2 | 15.0 |
| | 30.0 | 70.2 | 26.5(*) |
| "TERGITOL" 24-L-92 | 30.0 | 59.2(*) | 31.0(*) |
| "TERGITOL" NP-40 | 30.0 | 70.2 | 44.0 |
| Polypropylene Glycol 425 | 30.0 (112.5 at 54° C.) | 54.0(*) (93.0 at 54° C.) | 37.0(*) |
| "PLURACOL" 975 | 15.0 (110.0 at 54° C.) | 46.0(*) (49.0 at 54° C.) | 17.0 |
| | 30.0 | 70.2 (2 phases) | 50.5(*) |
| "ETHOX" DO-9 | 30.0 | 53.7(*) | 39.5(*) |
| Diglyme | 30.0 | 26.0(~) | 7.01(*) |
| Glyme | 30.0 | 16.0 | 2.5~ |
| DDE | 30.0 | 45.0(*) | 21.5~) |
| "ARCOSOLV" PM | 30.0 | 35.0(*) | 19.5(*) |
| Acetone | 30.0 | 19.5(*) | 5.9(*) |
| 2-Pentanone | 30.0 | 40.5(*) | 14.5(*) |
| Polymethylvinyl Ketone | 30.0 | 61.0(*) | 45.5(*) |

(* solution)

TABLE 6A

Boiling Point Elevation Data

| Compound | Boiling Point. °C. Actual | Raoult's Law |
|---|---|---|
| HCFC-123* | 27.6 | — |
| DBE | 196 | — |
| 30/70 HCFC-123*/DBE | 81 | 64 |
| DPM | 188 | — |
| 30/70 HCFC-123*/DPN | 88 | 67 |
| DPMA | 200 | — |
| 30/70 HCFC-123*/DPMA | 93 | 60 |

*Commercial grade; typically including up to about 10 percent HCFC-232a.

TABLE 6B

Effect of Hydrogen Bonding Agents on Vapor Pressures of CFC-124, HFC-125, HFC-134, HFC-134a and HFC-32

| Bonding Agent | Blowing Agent | Blowing Agent Wt. % | Vapor Pressures at 21° C. psig |
|---|---|---|---|
| None | CFC-114 | 100.0 | 12.9 |
| DBE | CFC-114 | 30.0 | 12.7(*) |
| None | HCFC-124 | 100.0 | 34.1 |
| DBE | HCFC-124 | 30.0 | 1.2(*) |
| Acetone | HCFC-124 | 30.0 | 0 (*) |
| 2-Pentanone | HCFC-124 | 30.0 | 1.8(*) |
| None | HFC-125 | 100.0 | 163.8 |
| DBE | HFC-125 | 30.0 | 35.0(*) |
| Acetone | HFC-125 | 30.0 | 10.0(*) |
| None | HFC-134a | 100.0 | 81.3 |
| DBE | HFC-134a | 30.0 | 15.3(*) |
| Acetone | HFC-134a | 30.0 | 3.5(*) |
| 2-Pentanone | HFC-134a | 30.0 | 12.0(*) |
| None | HFC-134 | 100.0 | 60.2 |
| DBE | HFC-134 | 30.0 | 7.0(*) |
| Acetone | HFC-134 | 30.0 | 0 (*) |
| None | HFC-32 | 100.0 | 206.3 |
| Acetone | HFC-32 | 30.0 | 41.0(*) |

(* solution)

EXAMPLE 3

For comparison purposes, HCFC-22 was combined with non-hydrogen bonding agents, such as stearyl stearamide ("KEMAMIDE" S-160) and glycerol monostearate ("WITCONOL" MST), and the vapor pressure of HCFC-22 showed slight, if any, depression. Thus, compounds which form strong hydrogen bonds with themselves, e.g., glycerol monostearate, do not associate with HCFC-22 and do not reduce the measured vapor pressure. The vapor pressure data are shown in Table 7.

TABLE 7

Vapor Pressure for HCFC-22 with Non-Hydrogen Bonding Agents

| Additive | Blowing Agent Wt. % | Vapor Pressure at 21° C. psig CFC-12 | HCFC-22 |
|---|---|---|---|
| None | 100.0 | 70.2 | 121.14 |
| "KEMAMIDE" S-180 | 30.0 | 70.2 | 121.4 |
| "WITCONOL" HST | 30.0 | 70.2 | 118.10 |
| "ALRAMIDE" HTDE | 30.0 | 70.2 | 105.0 |

TABLE 7-continued

Vapor Pressure for HCFC-22 with Non-Hydrogen Bonding Agents

| Additive | Blowing Agent Wt. % | Vapor Pressure at 21° C. psig CFC-12 | HCFC-22 |
|---|---|---|---|
| "ARMID" O | 30.0 | 70.2 | 118.0 |
| "SPAN" 60 | 30.0 | 70.2 | 108.5 |
| Glycerin | 30.0 | 70.2 | 121.4 |
| "SELAR" OH 3007 | 30.0 | 70.2 | 121.4 |
| "SELAR" PA 7426 | 30.0 | 70.2 | 121.4 |
| "SURLYN" 8396-2 | 30.0 | 70.2 | 121.4 |
| Polyacrylonitrile A-7 | 30.0 | 70.2 | 120.3 |
| "SOLEF" 1008-1001 | 30.0 | 70.2 | 121.4 |
| "ELVANOL" 90-50 | 30.0 | 70.2 | 121.4 |

EXAMPLE 4

The permeation of nitrogen and HCFC-22 through polystyrene film was measured for polymer films with and without blocking agents.

The permeation data was obtained on 15–20 mil thick polystyrene films which were prepared as follows:

(a) Hydrogen bond forming agents and polystyrene were passed through a twin screw extruder three times at 204° C. to ensure good blending of components. The extruder used was a 28 mm Werner and Pfleider, Stuttgart, Model 20S-K-28 twin screw.

(b) After pelletizing the extruded polymer, 15–20 mil thick films (in 6"×6" sheets) were pressed at about 35,000 psig pressure using a Barber-Coleman press.

(c) The 6"×6" sheets of 15–20 mil film were cut into 47 mm diameter circles or discs with a polymer die punch.

Permeation tests were run on polystyrene films containing various blocking agents to determine the permeation of air and blowing agents in polystyrene foam. Such film closely simulates polystyrene foam cell walls and the permeation data are predictive of foam blowing agent retention and susceptibility to air intrusion. Studies were made with HCFC-22 and nitrogen (simulating air).

Polystyrene Film Preparation (A) Mixing Polystyrene/Additives by Extrusion Samples of polystyrene (2500 grams) plus blocking agents were hand mixed and passed through a screw extruder three times at about 204° C. Three passes were used to ensure uniform blending of components. Since the polymer mixes were extruded into a water tank for cooling prior to pelletizing (between the passes through the extruder and after the third extrusion), the pelletized samples were dried about 16 hours in a vacuum oven at 79–93° C. The extruder used was a 28 mm Werner and Pfleider, Stuttgart, Model 20S-K-28 twin screw.

(B) Film Pressing of Polystyrene/Additive Mixtures

Using a Barber-Coleman press, 30 gram samples of polystyrene/additive mixes (as pellets) were pressed into 6"×6" sheets of film with 15–20 mil thickness. The pressing was done at 204° C. and at a pressure of about 35,000 psig (maintained for 5 minutes).

(C) Film Discs for Permeation Tests

Discs (15–20 mil thickness) were cut from 6"×6" sheets of film. Five discs of 47 mm diameter were made from each sheet. The discs were cut or stamped at ambient temperature using a die punch made of A-2 type steel (hardened).

Permeation Test Procedure

The permeation tests on the polystyrene film containing blocking agents were conducted by a modification of ASTM D1434-82, "Standard Method of Determining Gas Permeability Characteristics of Plastic Film and Sheeting". This modified procedure is described in the Haster of Chemical Engineering Thesis, P. S. Mukherjee, Widener University, Chester, Pa., February 1988, entitled "A Study of the Diffusion and Permeation Characteristics of Fluorocarbons Through Polymer Films".

Test Conditions (1) All tests were run at a 20 psia pressure differential between the high pressure side and the low pressure side of the permeation cell.

(2) Permeation tests were run at 60 to 120° C., with tests for each blocking agent/polystyrene/gas combination being run at two or more temperatures. Data for other temperatures were calculate from the equation: ln $P=A/T+B$, where P is permeation coefficient, T is °K. (°C.+273.2) and A and B are constants determined from the permeation coefficients calculated from the following equation:

$$P = \frac{\text{(Rate of Permeation)(Film Thickness)}}{\text{(Film Area)(Pressure drop across film)}}$$

(3) The permeation rates are based on a 1 cm² by 1 cm thick film with a 1.0 psia pressure drop across the film.

The permeation rate and permeation coefficient data for nitrogen in polystyrene containing blocking agents are summarized in Table 8. Data for HCFC-22 in polystyrene containing blocking agents are shown in Table 9. The units for permeation rate are g/hr and for permeation coefficient are cm³ (STP).cm/sec.cm².cmHg. The data summarized in Tables IV and V are calculated at 25° C. from data measured at other temperatures.

The chemicals used in the previous Examples and tests are identified structurally and by source as follows:

| Designation | Structure | Source |
|---|---|---|
| "CARBOWAX" 3350 | Polyethylene glycol | Union Carbide Corp. |
| "CARBOWAX" 8000 | Polyethylene glycol | Union Carbide Corp. |
| "Pluronic" F-108 | Ethylene oxide/propylene | BASF Wyandotte Corp. |
| "WITCONOL" H35A | Polyethylene glycol (400) stearate | Witco Corp. |
| "WITCONOL" MST | Glycerol monostearate | Witco Corp. |
| "TRITON" X-67 | Alkylpoly-ethoxy ethanol | Rohm and Haas Co. |
| "TWEEN" 61 | POE (4) sorbitan stearate | ICI Americas, Inc. |
| Polypropylene Glycol 2025 | Polypropylene glycol | Union Carbide Corp. |
| "ETHOFAT" 0/20 | Polyethylene oxide oleate | Akzo Chemie America |
| "ETHOMID" HT/60 | Polyethylene oxide fatty acid amide | Akzo Chemie America |
| Polyethylene Glycol Cpd 20M | Polyethylene glycol acid amide | Union Carbide Corp. |
| Polyethylene Glycol Cpd 20M | Polyethylene glycol | Union Carbide Corp. |
| "POLYOX" WSRN-10 | Polyethylene oxide | Union Carbide Corp. |
| "TERGITOL" 15-5-20 | Linear alcohol/ethylene oxide | Union Carbide Corp. |
| "TERGITOL" 24-L-92 | Linear alcohol/ethylene oxide | Union Carbide Corp. |

TABLE 8

Permeation Data
Polymer: Polystyrene* Temperature: 25° C.

| Gas | Blocking Agent | Wt. % in Polymer | Permeation Coeff. cm3 gas at STP cm sec cm2 (cm Hg) | Permeation Rate g/hr | % Change In Permeation Rate |
|---|---|---|---|---|---|
| Nitrogen | None | — | $8.00 \times 10^{-11}$ | $1.86 \times 10^{-9}$ | — |
| Nitrogen | "WITCONOL" | 5.0 | $5.50 \times 10^{-11}$ | $1.28 \times 10^{-9}$ | −31.2 |
| Nitrogen | "TRITON" X-67 | 5.0 | $4.49 \times 10^{-11}$ | $1.94 \times 10^{-9}$ | −44.1 |
| Nitrogen | Polypropylene Glycol 2025 | 5.0 | $4.72 \times 10^{-11}$ | $1.10 \times 10^{-9}$ | −40.9 |
| Nitrogen | "TWEEN" 61 | 5.0 | $4.672 \times 10^{-11}$ | $1.07 \times 10^{-9}$ | −42.5 |

TABLE 9

Permeation Data
Polymer: Polystyrene* Temperature: 25° C.

| Gas | Blocking Agent | Wt. % in Polymer | Permeation Coeff. cm3 gas at STP cm sec cm2 (cm Hg) | Permeation Rate g/hr | % Change In Permeation Rate |
|---|---|---|---|---|---|
| HCFC-22 | None | — | $5.41 \times 10^{-12}$ | $3.89 \times 10^{-10}$ | — |
| HCFC-22 | "WITCONOL" | 5.0 | $2.21 \times 10^{-12}$ | $1.58 \times 10^{-10}$ | −59.4 |

*"DYLENE" 8 polystyrene (Melt Index 6–7), Arco Chemical Company.

| Designation | Structure | Source |
|---|---|---|
| "TERGITOL" NP-40 | Nonylphenol/ ethylene oxide | Union Carbide Corp. |
| Polypropylene Glycol 425 | Polypropylene glycol | Union Carbide Corp. |
| "PLURACOL" 975 | Sucrose polyol | BASF Wyandotte Corp. |
| "ETHOX" DO-9 | Polyethylene glycol dioleate | Ethox Chemicals Inc. |
| Glyme | Ethylene glycol di- methylether | Aldrich Chemical Co. |
| Diglyme | 2-Methoxy- ethyl ether | Aldrich Chemical Co. |
| DBE | Mixture of dimethyl adipate, dimethyl gluta- rate and di- methyl succinate* | Du Pont Co. |
| "ARCOSOLV" PM | Propylene glycol mono- ethyl ether | Arco Chemical co. |
| "ARCOSOLV" DPM | Dipropylene glycol mono- methyl ether | Arco Chemical Co. |
| "ARCOSOLV" DPNA | Dipropylene glycol mono- methyl ether acetate | Arco Chemical Co. |
| "KEMAMIDE" S-180 | Stearyl stearamide | Witco Corp. |
| Acetone | — | Fisher Scientific |
| 2-Pentanone | Methyl propyl ketone | Pfaltz and Bauer, Inc. |
| "ALKAMIDE" HTDE | stearic diethanolamide | Alkaril Chemicals, Ltd |
| "ARMID" O | Oleamide | Akzo Chemie America |
| "SPAN" 60 | Sorbitan stearate | ICI Americas, Inc. |
| Glycerin | — | Aldrich Chemical Co. |
| "SELAR" OH 3007 | Ethylene/ vinyl alcohol copolymer | Du Pont Co. |
| "SELAR" PA 7426 | Amorphous nylon | Du Pont Co. |
| "SURLYN" 8396-2 | Ethylene/ methacrylic acid copolymer | Du Pont Co. |
| Polymeric Acrylonitrile A-7 | Acrylonitrile- methyl acrylate copolymer | Du Pont Co. |
| "SOLEF" 1008-1001 | Polyvinyli- dene fluoride | Soltex Polymer Corp. |
| "ELVANOL" 90-50 | Polyvinyl alcohol | Du Pont Co. |
| "DYLENE" 8 | Polystyrene | Arco Chemical Co. |
| Polymethylvinyl Ketone (8919) | — | Honomer-Polymer Laboratories, Inc. |
| CFC-12 | Dichlorodifluoro- methane | Du Pont Co. |
| CFC-114 | 1,2-dichlorotetra- fluoroethane | Du Pont Co. |
| HCFC-22 | Chlorodifluoro- methane | Du Pont Co. |
| HCFC-123 | 1,1,1-trifluoro-2,2- dichloroethane | Du Pont Co. |
| HCFC-123a | 1,1,2-trifluoro-1,2- dichloroethane | Du Pont Co. |
| HCFC-124 | 1,1,1,2-tetrafluoro- chloroethane | Du Pont Co. |
| HFC-125 | Pentafluoroethane | Du Pont Co. |
| HFC-32 | Difluoromethane | Du Pont Co. |
| HFC-134 | 1,1,2,2-tetrafluoro- ethane | Du Pont Co. |
| HFC-134a | 1,1,1,2-tetrafluoro- ethane | Du Pont Co. |
| HCFC-141b | 1-fluoro-1,1-di- chloroethane | Du Pont Co. |

*17/66/16.5 mixture of esters

Example 5

The following example serves to illustrate the ability to use HFC-134 to produce a polystyrene insulation foam with fine, uniform cell structure, long-term insulation value, and good dimensional stability.

The extruder employed was designed for use with CFC-12 ($CCl_2F_2$) and was converted to a blowing agent blend of HCFC-142b ($CFCl_2CH_3$)/HCFC-22 ($CHClF_2$) 60/40 wt. %. The HCFC-142b/HCFC-22 blend exhibits solution pressure in polystyrene similar to CFC-12.

The example 5 data reveals that HFC-134 performs very similar to HCFC-142b/HCFC-22 blend (note die pressure, foam thickness, foam width, and foam density). With HFC-134a, the die gap had to be closed to control the process (from 1.9 mm to 1.7 mm), which yielded a higher operating pressure (2483 psig). It was also necessary to reduce the resin melt temperature (from 129° C. to 116° C.) to reduce premature foaming in the die. However, even with these changes, HFC-134a blown foam was heavy (43 kg/cubic meter), had a rough surface, and did not achieve the required thickness and width.

Foam trials to produce polystyrene foam insulation were conducted using a commercial tandem extruder equipped with an experimental die, designed for higher pressure operation.

Primary extruder diameter=120 mm.

Secondary extruder diameter=200 mm.

Polystyrene resin=Shell NX606 general purpose, 2.5 melt index.

Nucleator=Magnesium silicate talc

| Blowing agent | Trial 1 22/142b 40/60 wt % | Trial 2 HFC-134a | Trial 3 HFC-134 |
|---|---|---|---|
| Primary extruder (rpm) | 70 | 70 | 70 |
| Primary extruder (amps) | 264 | 270 | 267 |
| Extrusion rate (kg/hr) | 430 | 422 | 438 |
| Blowing agent rate (kg/hr) | 46.5 | 45.8 | 45.1 |
| Blowing agent concentration (wt %) | 10.82 | 10.86 | 10.31 |
| Nucleator concentration (wt %) | 0.6 | 1.16 | 0.8 |
| Secondary extruder speed (rpm) | 4.9 | 4.9 | 4.9 |
| Secondary extruder (amps) | 102 | 122 | 112 |
| Die pressure (psig) | 1484 | 2483 | 1645 |
| Melt temperature (° C.) | 129 | 116 | 127 |
| Die gap (mm) | 1.9 | 1.7 | 1.9 |
| Die width (mm) | 100 | 100 | 100 |
| Foam thickness (mm) | 52 | 44 | 50 |
| Foam width (mm) | 317 | 249 | 285 |
| Foam density (kg/m$^3$) | 30.5 | 43 | 32.5 |
| Comments | Excellent foam | Too thin Foaming in die | Excellent foam Rough surface |

Having thus described and exemplified the invention with a certain degree of specificity, it should be appreciated that the following claims are not to be so limited but are to be afforded a scope commensurate with the wording of each element of the claims and equivalents thereof.

What is claimed is:

1. A method for preparing a non-flammable insulating thermoplastic foam body comprising the steps of
   a) providing a first molten composition of thermoplastic resin,
   b) introducing an effective quantity of a blowing agent composition, said blowing agent composition comprising at least 70 weight percent 1,1,2,2 tetrafluoroethane and no components having halogen substituents other than fluorine into said first molten composition
   c) dispersing said blowing agent composition throughout said first molten composition to form a second molten composition; and
   d) extruding said second molten composition through a die from a region of high pressure to a region of low pressure such that said second molten composition foams upon extrusion through said die to form a closed cell thermoplastic foam body having a density of about 0.75–15 pounds per cubic foot (12 to 240 kilograms per cubic meter) and having cells of an average cell size of 0.1–1.5 mm.

2. A method as in claim 1 wherein said thermoplastic resin is a styrenic resin.

3. A method as in claim 1 wherein said blowing agent composition comprises up to 30% of at least one compound selected from the group consisting of 1,1,1,2-tetrafluoroethane, 1,1-difluoroethane, 1,1,1-trifluoroethane, difluoromethane and pentafluoroethane.

4. A method as in claim 1 wherein said blowing agent composition comprises at least 87 weight percent 1,1,2,2 tetrafluoroethane.

* * * * *